Oct. 19, 1926.
D. L. MIDDENDORF
PROCESS AND APPARATUS FOR PRODUCING CRACKLED GLASSWARE
Filed Feb. 4, 1926
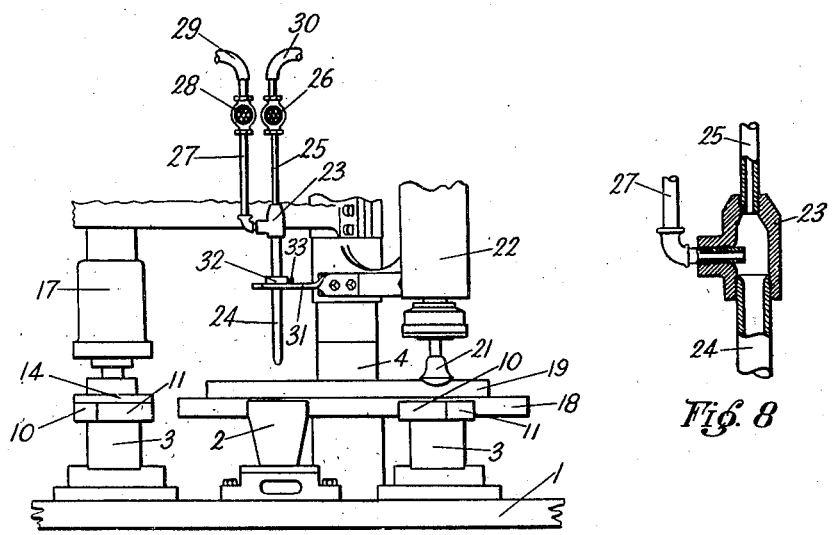
Fig. 1
Fig. 8
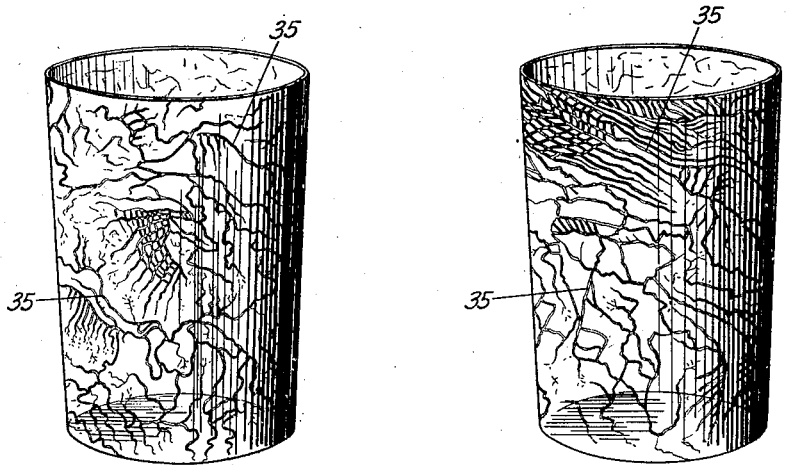
Fig. 2
Fig. 3
David L. Middendorf
INVENTOR.
BY
Edwin P. Cortes
ATTORNEY Oct. 19, 1926.  
D. L. MIDDENDORF  
1,603,552  
PROCESS AND APPARATUS FOR PRODUCING CRACKLED GLASSWARE  
Filed Feb. 4, 1926   2 Sheets-Sheet 2

David L. Middendorf  
INVENTOR.  
BY  
ATTORNEY

Patented Oct. 19, 1926.

1,603,552

UNITED STATES PATENT OFFICE.

DAVID L. MIDDENDORF, OF COLUMBUS, OHIO, ASSIGNOR TO THE FEDERAL GLASS COMPANY, OF COLUMBUS, OHIO, A CORPORATION OF OHIO.

PROCESS AND APPARATUS FOR PRODUCING CRACKLED GLASSWARE.

Application filed February 4, 1926. Serial No. 85,872.

My invention relates broadly to a process and apparatus for producing crackled glassware and more particularly to a method of covering either or both surfaces of a blank with a network of fine lines and cracks which are subsequently enlarged when the blank is shaped to final form.

Heretofore, in the manufacture of imitation crackled glassware, it has been the practice to form the articles in a mold having a relief design cut in its interior surface to produce an intaglio design on the exterior surface of the article. The resulting product is not genuine crackled glassware but only an imitation, and the method necessitates the use of sectional molds which produce objectionable "fins" on the article. Moreover, all articles produced have exactly the same surface design. Likewise, it is not possible to produce a design on the interior surface of the articles produced by this method.

The primary object of my invention is the provision of a method and apparatus for manufacturing crackled or crazed glassware, i. e., glassware the surface of which is covered with a network of fine cracks and grooves.

Other objects of my invention will appear from the following description and its various features are illustrated in the accompanying drawings wherein similar reference numerals designate corresponding parts in the several figures and wherein—

Figure 1 is a fragmentary elevational view of a glass forming machine showing the press and blow molds and the location of my novel mold and blank spraying device with reference thereto;

Figures 2 and 3 are perspective views of crackled glass articles produced according to my method;

Figure 8 is a partly sectional elevational view showing the interior of the atomizer.

Figure 4:
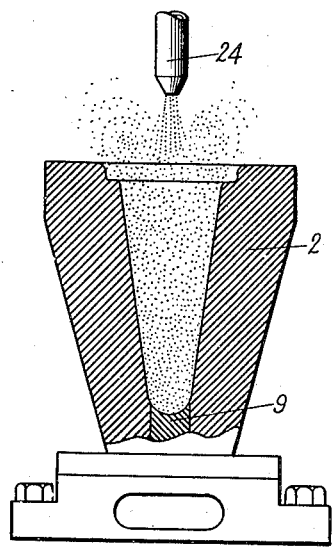
Figure 4 is an elevational view, partly in section, showing a blank forming mold in position under a spraying nozzle.

In the drawings, one illustrative embodiment of my invention is shown in association with a glass forming machine of the press and blow type which comprises a mold carrying table 1, upon which the parison or blank molds 2 and the blow molds 3 are alternately arranged in a substantially circular path about the center post 4.

Forming machines of the press and blow type are usually provided with a reciprocable plunger 5 and ring mold 6 (Figure 5) which are adapted to cooperate with the blank molds 2 to press a blow blank or parison 7 having a bead portion 8, from a previously deposited mass of glass. Suitable quantities of molten glass may be deposited in the successively presented blank molds 2 in any approved manner, as for instance, by an automatic feeding machine or manually.

After the blow blank 7 and its bead portion 8 have been formed as just described, the plunger 5 and ring mold 6 may be elevated and the reciprocable ejector 9 operated to lift the blow blank 7 and bead 8 out of contact with the blank mold 2. Suitable transfer mechanism may now come into operation and lift the blank 7 completely out of the blank mold 2 and deposit it in a blow mold 3, the shape of which varies according to the size and shape of the article being produced.

Figure 6:
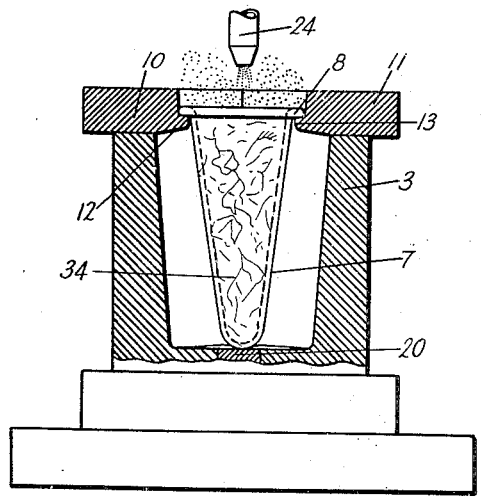
Figure 6 is an elevational view, partly in section, showing a blow mold having a parison positioned therein under a spraying nozzle.
Figure 7:
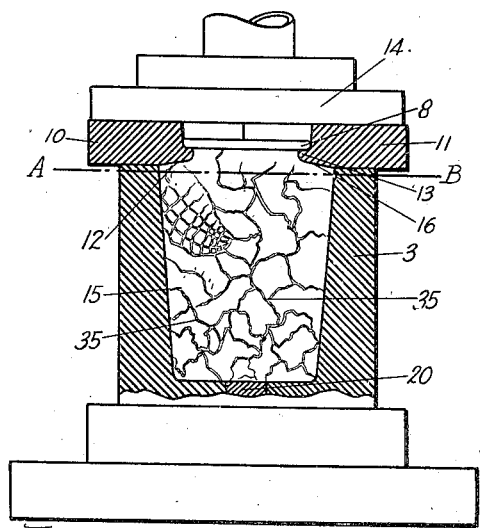
Figure 7 is an elevational view, partly in section, showing a blow mold having a blown parison therein and a blow head coacting with the mold.

The blow mold 3 is preferably but not necessarily, of the non-sectional type and may be provided with a neck ring yoke or sectional cover members 10 and 11 formed with complementary shoulders 12 and 13 which are adapted to support the blow blank 7 by its bead portion 8 in the manner shown in Figure 6. After the blow blank 7 has been positioned within the blow mold 3, as shown in Figure 6, a suitable fluid pressure blow head 14 may be moved onto the cover members 10 and 11 and the blank 7 expanded or blown into forming contact with the mold 3, to form an integral article 15, hood portion 16 and bead 8 as shown in Figure 7. Air or other suitable fluid may be utilized for expanding or blowing the blank 7, and when the blowing has been completed, the blow head 14 may be elevated by means of a fluid pressure cylinder or other suitable means 17; the cover members 10 and 11 opened by means of operating cams 18 and 19; the reciprocable ejector 20 elevated to raise the formed article out of contact with the blow mold 3 and the formed article then removed from the blow mold. In subsequent operations the formed article is annealed; the hood portion 16 and bead 8 cracked off along the line A—B; the top edges given a heat treatment and the article is then ready for sale.

The structural features of the forming machine and its operation will not be described in detail because such description is unnecessary to an understanding of my invention. It may, however, be mentioned that the mold table 1 is given a step-by-step rotary motion by suitable mechanism (not shown) for carrying the press molds 2 and blow molds 3 to the successive stations where the different operations as above described are performed.

Under some conditions it may be desirable to fire polish the interior of the blank 7 before it is blown, and for this purpose I may employ a fire head or burner 21 which is, preferably, vertically reciprocable above and in alignment with the blow mold 3 by means of a fluid pressure cylinder or other suitable device 22. In the operation of this burner 21, when a blow mold 3, in which a pressed blank 7 has been positioned, is carried under the burner 21, an intense flame issues therefrom and impinges upon the interior surface of the blank and imparts a brilliant finish to such surface before the blank is blown in the manner previously described. It will be understood that the burner 21, or a similar device, may be employed for fire polishing the interior of the article after blowing and that such interior may be fire polished both before and after blowing if desired.

In connection with the above described process of manufacturing glass articles by pressing and blowing, my invention contemplates a method and apparatus for crackling or crazing the exterior or interior surfaces or both surfaces of the article being produced. In general, my invention provides means for covering the exterior surface of a pressed blank with a network of fine lines or cracks which are subsequently enlarged when the blank is blown. Means is also provided for crackling or crazing the interior surface of a pressed blank before blowing so that both the interior and exterior surfaces of an article may be crackled if desired. It is understood that the particular embodiment of my invention hereafter described may be varied to accommodate it to different makes of forming machines and different types of ware.

In combination with the forming machine heretofore described, I have provided an atomizer 23 which comprises a nozzle 24, an air inlet 25 controlled by a suitable valve 26 and a water inlet 27 controlled by a suitable valve 28. Water and air are supplied to the respective inlets by conduits 29 and 30 and the entire atomizer may be supported above and in alignment with the path of the molds 2 and 3 by means of a bracket 31. A collar 32, secured in place upon nozzle 24 by means of a set-screw 33, permits vertical adjustment of the nozzle 24 with respect to the molds 2 and 3.

Figure 5:
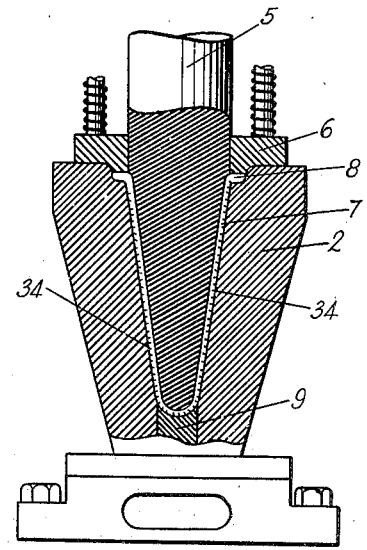
Figure 5 is an elevational view, partly in section, showing a blank forming mold, pressing plunger, ring mold and pressed parison.

The atomizer 23 may be positioned in alignment with one of the places where the blank molds 2 stop before the masses of glass are deposited therein. By suitably adjusting the air valve 26 and the water valve 28 a mist or vapor may be expelled from the end of nozzle 24 as shown in Figure 4. This mist or vapor impinges upon the interior forming surface of the successively presented empty blank molds 2 (Figure 4), and results in chilling or cooling this surface to such an extent that when a mass of glass is deposited in the blank mold and pressed, the exterior surface of the resulting blank 7 will be covered with a network of fine lines and cracks 34, as best shown in Figures 5 and 6. These cracks and lines 34 are confined to the surface and do not extend through the blank. The blank 7 may now be transferred to a blow mold 3 in the usual manner and blown, when the small lines and cracks 34 will be enlarged and widened by the stretching and expansion of the blank 7 during the blowing. The appearance of the blown article is shown in Figure 7 and it will be noted that the cracks 35 are larger and wider than the cracks and lines 34 in the blow blank 7. The articles produced may be subsequently decorated by filling the cracks 35 to make inlaid glassware.

Since the blow molds 3 travel under the nozzle 24 after the pressed blanks have been positioned therein, it results that the interior surface of the pressed blanks are also slightly cracked by the mist or vapor and these cracks are also enlarged during blowing, so that both the interior and exterior surfaces of the completed article are cracked or crazed. Obviously, this cracking of the interior may be prevented by swinging the nozzle 24 out of alignment when the blow mold travels thereunder or by interposing a deflector between the end of the nozzle 24 and the blow mold 3 or by discontinuing the expulsion of vapor while the blow mold travels beneath the nozzle 24. This may be done automatically or otherwise.

It is also obvious that the interior surface alone may be crackled by impinging a mist against such surface before blowing and omitting the step of cooling the blank mold in the manner previously described. The extent to which the exterior surface is crackled may be controlled and varied to some extent by regulating the quantity of vapor admitted to the blank mold and the extent to which the interior surface is crackled may also be controlled by regulating the quantity of vapor admitted to the interior of the blanks 7.

I do not desire to limit my invention to the use of water and air because other liquids may be employed and other methods of atomizing liquids are well known and can be employed in lieu of the air jet previously described.

From the foregoing description, it will be obvious that my invention provides a novel method of crackling glassware which does not involve the use of engraved molds or the duplication of designs and which is adaptable to mechanical and automatic methods of manufacturing glassware.

Claims:

1. The method of manufacturing crackled glassware which comprises introducing the glass in a mold, chilling the glass in the mold sufficiently to produce a crackled surface, and shaping the glass, the chilling of the glass to produce crackling being effected by the time shaping is completed.

2. The method of manufacturing crackled glassware which comprises pressing a charge of glass in a mold cooled sufficiently to form a crackled blank, transferring said blank to a blow mold and then blowing said blank.

3. The method of manufacturing crackled glassware which comprises impinging an atomized fluid upon the forming surface of a mold and then forming an article in said mold.

4. The method of manufacturing crackled glassware which comprises directing atomized water into a metal mold and then forming an article in said mold.

5. Apparatus for producing crackled glassware comprising a blank mold having a metallic forming surface, means for spraying the forming surface of said mold with atomized water to produce a crackled exterior surface on the blank to be formed therein, means for forming a glass blank in said mold, a blow mold and means for blowing a blank positioned therein.

6. Apparatus for use in manufacturing crackled glassware comprising a parison mold, means for directing atomized fluid against the forming surface thereof to produce a crackled exterior surface on the parison to be formed in contact therewith, means for forming a parison in said mold, a blow mold and means for blowing a parison therein.

7. Apparatus for crackling glassware comprising a parison mold, means for forming and discharging moisture impregnated air into said mold to cool its forming surface, means for pressing a parison therein, a blow mold and means for expanding a parison into contact therewith.

8. Apparatus for crackling glassware comprising a metal mold, means for injecting vapor into said mold to cool its forming surface, and means for forcing molten glass into contact with the forming surface of said mold to produce an externally crackled article.

9. The method of manufacturing crackled glassware which comprises cooling a metal mold surface sufficiently to produce crackling in the blank, and then forming an article in contact with such surface.

10. The method of manufacturing crackled glassware which comprises simultaneously pressing a blank and crackling a surface thereof, and later shaping such blank to final form.

11. The method of manufacturing crackled glassware which comprises pressing a blank in a mold and forming a crackled surface thereon, and later blowing the blank so produced.

12. The method of manufacturing crackled glassware which comprises directing moisture-laden air into a mold, depositing a charge of glass in such mold, pressing such charge of glass to produce an externally crackled blank, transferring such blank to a blow mold and then blowing said blank.

13. The process of making crackled glassware which comprises directing a jet of water impregnated air into a press mold immediately prior to the depositing of the charge of glass therein, depositing a charge of glass in such mold and then pressing such charge of glass.

14. The method of manufacturing crackled glassware which comprises moving a blank mold to successive positions, positively cooling the forming surface of such mold in one position, depositing a charge of glass in such mold in another position, pressing such charge of glass while such mold is in still another position to produce an externally crackled blank, transferring the blank so produced to a blow mold and later blowing such blank.

15. In the art of making crackled glassware by the press and blow method, the steps which comprise successively chilling the forming surface of a blank mold sufficiently to produce crackling, charging such mold with molten glass and then pressing such charge of glass to form an externally crackled blank.

16. In the process of producing crackled glassware by the press and blow method, the step of pressing and chilling a portion of the blank sufficiently to produce a crackled surface in the finished article.

17. In the process of producing crackled glassware by the press and blow method, the step of pressing and chilling a portion of the blank sufficiently to produce a crackled surface in the finished article, and then blowing.

18. In the process of producing crackled glassware by the press and blow method, the step of pressing and subjecting the blank to a chilling sufficient to produce crackling in the finished article.

19. In press and blow apparatus, a parison mold, and means associated with said mold for subjecting the glass to a chilling sufficient to produce crackling in the finished article.

In testimony whereof I hereby affix my signature.

DAVID L. MIDDENDORF.